United States Patent
Moriyama

(10) Patent No.: US 7,123,272 B2
(45) Date of Patent: Oct. 17, 2006

(54) GAME MACHINE, GAME TITLE DISPLAY CONTROL METHOD AND PROGRAM

(75) Inventor: Shinji Moriyama, Tokyo (JP)

(73) Assignee: Konami Corporation, Tokyo (JP)

( * ) Notice: Subject to any disclaimer, the term of this patent is extended or adjusted under 35 U.S.C. 154(b) by 210 days.

(21) Appl. No.: 10/107,059

(22) Filed: Mar. 28, 2002

(65) Prior Publication Data

US 2003/0011620 A1 Jan. 16, 2003

(30) Foreign Application Priority Data

Jul. 10, 2001 (JP) .............................. 2001-209815

(51) Int. Cl.
G09G 5/00 (2006.01)
A63F 13/00 (2006.01)
G06F 3/00 (2006.01)

(52) U.S. Cl. .................... 345/619; 463/29; 715/814

(58) Field of Classification Search ................ 345/619, 345/814; 463/23, 29
See application file for complete search history.

(56) References Cited

U.S. PATENT DOCUMENTS

| | | | | |
|---|---|---|---|---|
| 4,424,967 A * | 1/1984 | Yokoi et al. | ................... | 463/29 |
| 4,438,926 A * | 3/1984 | Yokoi et al. | ................... | 463/29 |
| 5,720,663 A * | 2/1998 | Nakatani et al. | ............... | 463/23 |
| 5,812,123 A * | 9/1998 | Rowe et al. | .................... | 725/43 |
| 5,850,447 A * | 12/1998 | Peyret | .......................... | 463/29 |
| 5,931,734 A * | 8/1999 | Nakatani et al. | .............. | 463/23 |
| 6,251,012 B1 * | 6/2001 | Horigami et al. | ............... | 463/7 |
| 6,469,718 B1 * | 10/2002 | Setogawa et al. | ........... | 345/810 |
| 6,565,437 B1 * | 5/2003 | Orui | ............................ | 463/29 |
| 6,605,003 B1 * | 8/2003 | Suchocki et al. | ............. | 463/29 |
| 2001/0031665 A1 * | 10/2001 | Taho et al. | .................... | 463/43 |
| 2002/0032052 A1 * | 3/2002 | Levitan | ........................ | 463/29 |
| 2002/0137565 A1 * | 9/2002 | Blanco | ........................ | 463/46 |
| 2003/0008708 A1 * | 1/2003 | Suchocki et al. | ............. | 463/29 |
| 2003/0017872 A1 * | 1/2003 | Oishi et al. | .................... | 463/33 |

OTHER PUBLICATIONS

"You don't know Jack—Sports", Boyden et al., Berkeley Systems, Inc., 1996.*
Tokuma Intermedia Mook: Chozetsu Daigirin, Summer Edition, 1995, published by Tokuma Shoten Intermedia Co. Ltd., Aug. 20, 1995, p. 65.
"Uruwaza Daigirin 1991", published by Tokuma Shoten Intermedia Co., Ltd., Jan. 25, 1991, p. 43, 140.

* cited by examiner

*Primary Examiner*—Ryan Yang
(74) *Attorney, Agent, or Firm*—Sughrue Mion, PLLC

(57) ABSTRACT

A game machine capable of causing a player to pay attention to a game title image. The game machine comprises a default game title image storing section (52), an optional game title image storing section (54), an operation input section (60), a selection section (62), and a display section (64). When no game operation input is made within a predetermined time after a predetermined timing, the selection section (62) selects a default game title image so that the default game title image is displayed by the display section (62). When any game operation input is made within a predetermined time, on the other hand, either a default or optional game title image is displayed by the display section (62) depending on whether the content of the game operation input satisfies a predetermined condition.

11 Claims, 10 Drawing Sheets

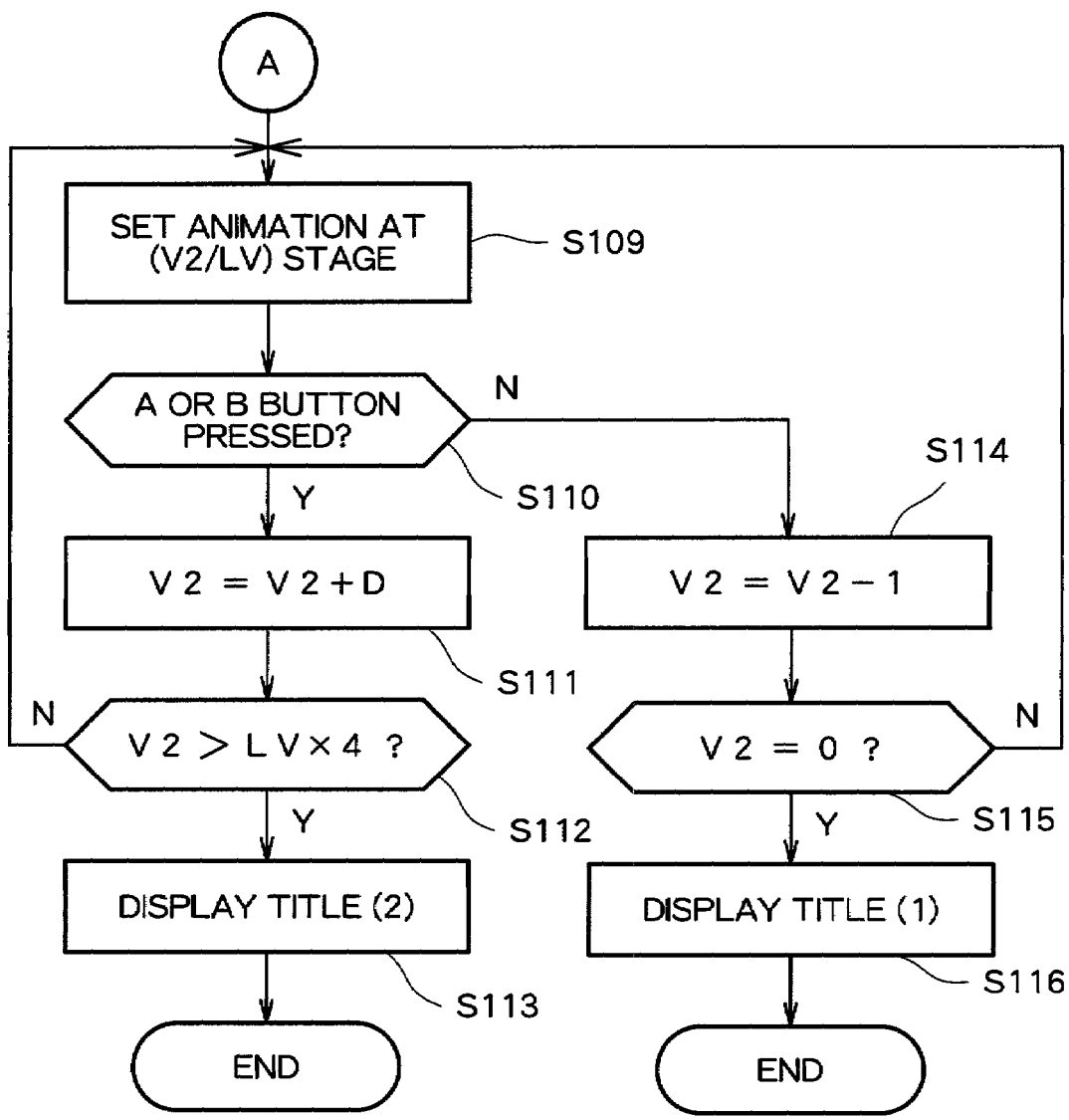
F I G. 14

GAME MACHINE, GAME TITLE DISPLAY CONTROL METHOD AND PROGRAM

BACKGROUND OF THE INVENTION

The present invention relates to a game machine, a game title display control method, and a program.

Most game programs and machines display a game title image which contains a game title and so forth when turning on the power or ending the game. The game title image may often change to other images when a start button is pressed, or a coin is inserted with business-use game machines, while displaying such a game title image, which may additionally contain copyright notices and so.

Although a game title image may be displayed frequently, as its content is very simple, a player having once seen the game title image may thereafter press a start button or insert a coin to change the screen images without paying much attention to the title image.

SUMMARY OF THE INVENTION

The present invention has been convinced in order to address this problem, and aims to provide a game machine, a game title display control method, and a program capable of causing a player to pay attention to the game title image.

In order to achieve the above objects, according to one aspect of the present invention, there is provided a game machine capable of displaying a game title image containing at least a game title, comprising: storing means for storing at least two kinds of game title image; operation input means for allowing a game operation input by a player; and selectively displaying means for displaying either one of the at least two kinds of game title images depending on content of the game operation input.

According to another aspect of the present invention, there is provided a game title display control method for controlling displaying of a game title image containing at least a game title, comprising: a game operation input obtaining step of obtaining a player's game operation input; and a game title displaying step of displaying either one of at least two kinds of game title image according to content of the game operation input.

According to another aspect of the present invention, there is provided a program for causing a computer to operate as a game machine capable of displaying a game title image containing at least a game title. With this program, the computer specifically operates as storing means for storing at least two kinds of game title images; operation input means for allowing a game operation input by a player; and selectively displaying means for displaying at least two kinds of game title images according to content of the game operation input.

In an embodiment of the present invention, either one of the at least two kinds of game title images may be selectively displayed according to the content of the game operation input. This arrangement can impart variation to displaying of the game title images, and resultantly cause the player to pay attention to the game title image. Note that the respective game title images may each comprise one or more still or motion pictures (including animation images). Alternatively, three or more kinds of game title images may be prepared in advance. For example, three kinds of game title images may be prepared so that any of the three kinds of game title images may be selectively displayed according to the content of the game operation input.

In one embodiment of the present invention, the selectively displaying means of the game machine may display a default game title image out of the at least two kinds of game title images when no game operation input is made within a predetermined time period and, when a game operation input is made within a predetermined time period, display either one of the at least two kinds of game title image depending on whether or not the game operation input satisfies a predetermined condition. In this embodiment, the at least two kinds of game tile images may include a default game title image. A default game title image is a game title image (an image containing a game title) to be displayed either when no game operation input is made within a predetermined time or when the content of the game operation input does not satisfy a predetermined condition. Therefore, in this embodiment, a game title image other than the default game title image can be displayed only when a game operation input having a content that satisfies a predetermined condition is input within a predetermined time. This arrangement can impart novelty value to a game title image other than the default game title image and game tastes to the game title image display. In this embodiment, the selectively displaying means of the game machine may display an intermediate image, for example, after a predetermined timing before either one of the at least two kinds of game title image is displayed, the intermediate image varying according to content of the game operation input.

With this arrangement, a game operation input triggers displaying of intermediate pictures which change according to the content of the game operation input. This arrangement can cause the player to expect to see a game title image other than the default game title image that cannot generally be seen if he continues game operation inputting.

In an embodiment of the present invention, the game title display means of the game machine may display either one of the at least two kinds of game title images depending on content of the game operation input made after a predetermined timing.

In an embodiment of the present invention, at the game title displaying step, either one of the at least two kinds of game title images is displayed according to the content of the game operation input made after a predetermined timing.

Here, the predetermined timing corresponds to a timing at which, for example, to display an image which precedes a game title image or to end the displaying, and so forth. With this arrangement, the player is required to contemplate a timing at which to make a game operation input in order to change a game title image to be displayed. This resultantly can enhance the nature of the game and cause the player to pay attention to the game title image.

BRIEF DESCRIPTION OF THE DRAWINGS

The above and the other objects, features, and advantages of the present invention, will become further apparent from the following description of the preferred embodiment taken in conjunction with the accompanying drawings wherein:

FIG. 14 is a flowchart explaining processing for displaying a game title image.

DESCRIPTION OF THE PREFERRED EMBODIMENT

The entire disclosure of the corresponding Japanese application 2001-209815 filed on Jul. 10, 2001 including specification, claims, drawings and summary, is incorporated herein by reference.

In the following, a preferred embodiment of the present invention will be described with reference to the accompanying drawings.

Figure 1:
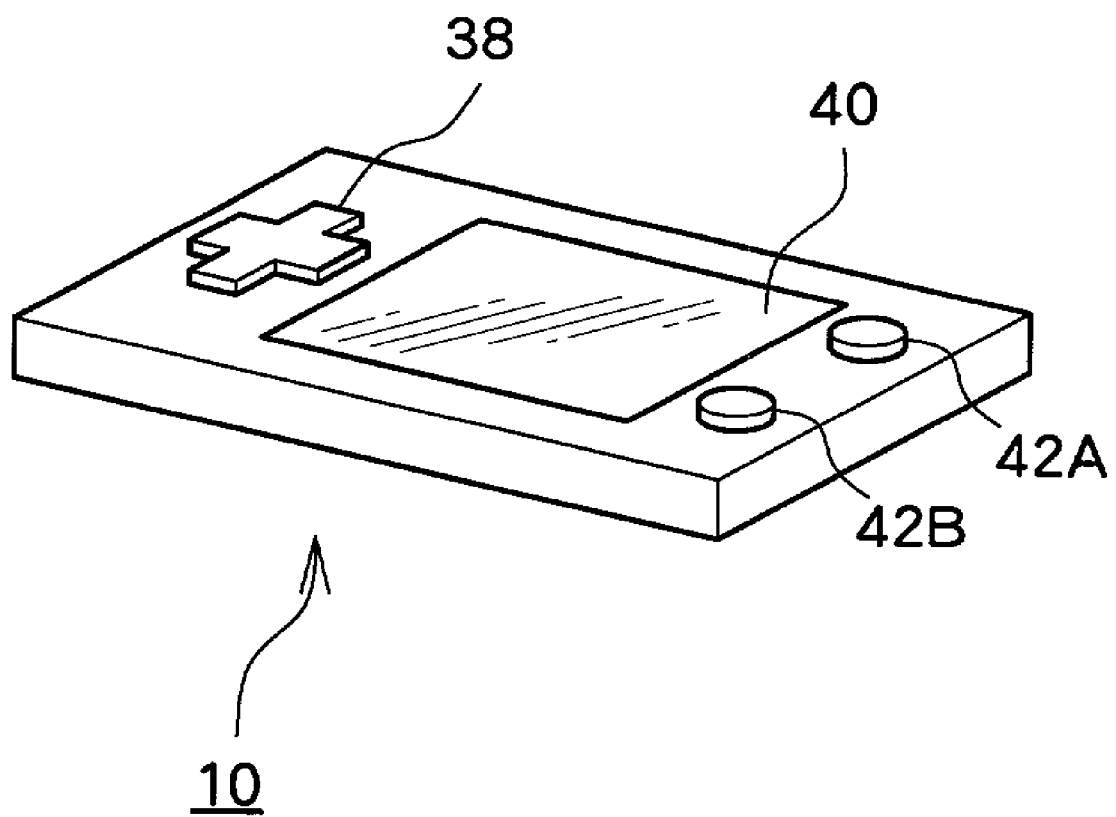
FIG. 1 is a perspective view showing an external appearance of a portable game machine used as a game machine according to an embodiment of the present invention.

FIG. 1 is a diagram showing an external appearance of a portable game machine used as a game machine according to an embodiment of the present invention. The shown portable game machine 10 comprises a liquid crystal display panel 40, a cross-shaped key 38, and buttons 42A, 42B, all provided on the surface thereof. The portable game machine 10 is driven by a battery so that a player can enjoy the game anywhere they want to. Note that the shown portable game machine 10 may comprise other operation members, not shown, such as a power switch. Also note that a program to be executed on the shown portable game machine 10 is one embodiment of a program according to the present invention, and a game title display control method executed on the shown portable game machine 10 is one embodiment of a game title display control method according to the present invention.

Figure 2:
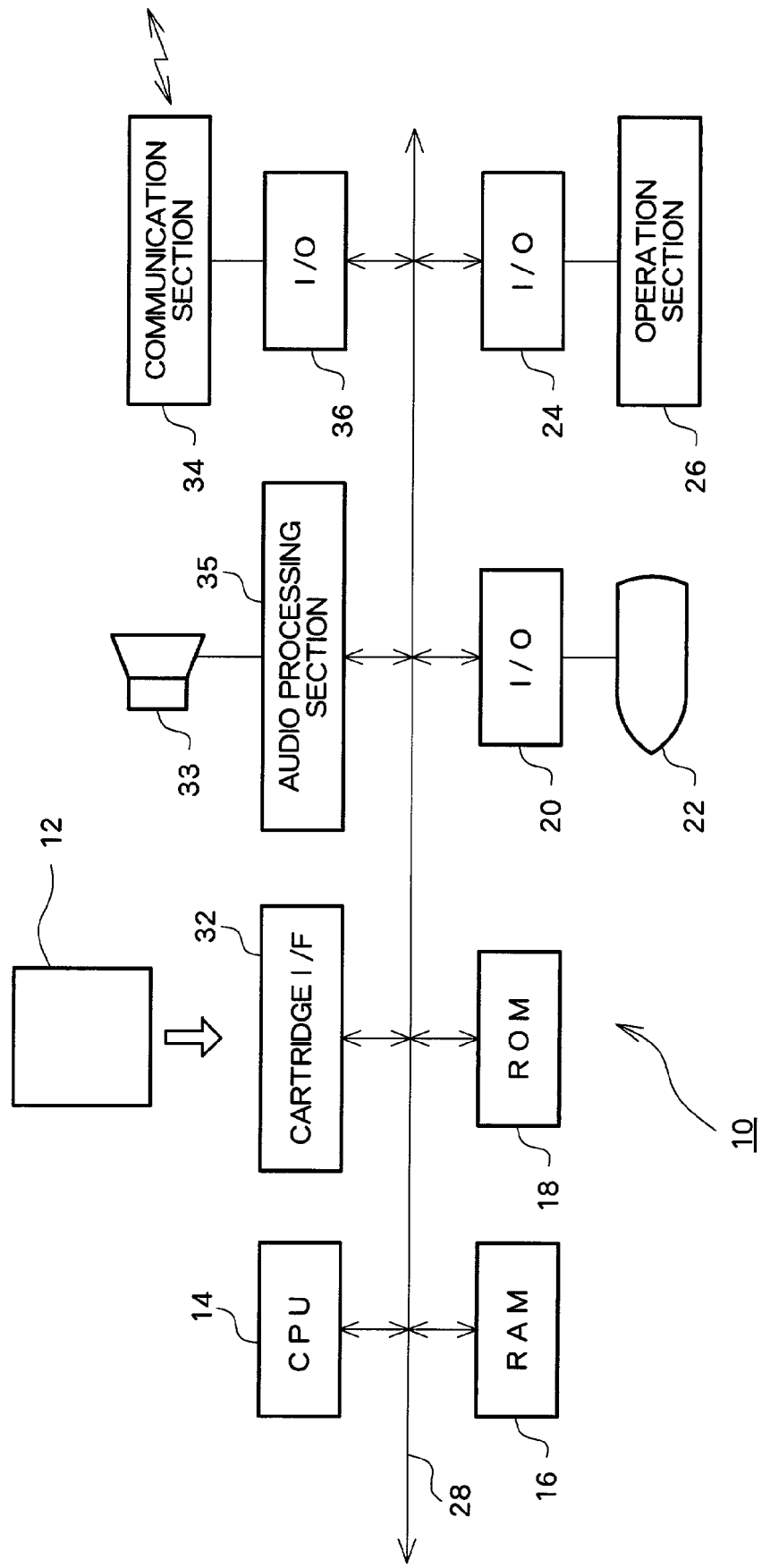
FIG. 2 is a block diagram showing a hardware structure of the portable game machine.

FIG. 2 is a diagram showing a hardware structure of the portable game machine 10. A game machine according to this embodiment of the present invention is realized by attaching a game cartridge 12, which incorporates a Read Only Memory, or ROM, into a cartridge interface 32 so that a game program and game data stored in the ROM is read into the portable game machine 10. Note that although the game cartridge 12 is used here to supply a game program and game data to the portable game machine 10, any other information storage media, such as a compact disk-read only memory, or CD-ROM, a digital versatile disk, or a DVD, or the like, can be similarly used. Alternatively, a communication network, such as the Internet, may be used to remotely provide a game program and game data to the portable game machine 10. Still alternatively, various data communications, such as infrared communication, serial communication, and so forth, may be used to provide a game program and game data from an installed-type game machine, a personal computer, and so forth, to the portable game machine 10.

In the portable game machine 10, a central processing unit, or a CPU, 14, a random access memory, or a RAM, 16, the ROM 18, input/output interfaces 20, 24, 36, and an audio processing section 35 are mutually connected via a bus 28 so as to allow data communication. The input/output interface 36 is connected to a communication section 34, the input/output interface 20 is connected to a display 22, the input/output interface 24 is connected to an operation section 26, and the audio processing section 35 is connected to a speaker 33. These components are all accommodated in an enclosure together with a battery, and driven by the battery, which allows these to be carried.

The CPU 14 controls the various sections of the portable game machine 10 based on an operating system, or an OS, stored in the ROM 18 and a game program read from the game cartridge 12. The bus 28 is necessary to exchange addresses and data among the respective sections of the portable game machine 10. The RAM 16 is written, upon necessity, with a game program and game data read from the game cartridge 12. The RAM 16 has a working area for the CPU 14. The display 22 is constructed including a liquid crystal display panel 40 and displays a game screen image created by the CPU 14. The audio processing section 35 outputs game music and effective sounds, prepared by the CPU 14, through the speaker 33.

The input/output interfaces 20, 24, and 36 relay data communication between the CPU 14 and the display 22, the operation section 26, the cartridge interface 32, and communication section 34, respectively. The operation section 26 includes a cross-shaped key 38, buttons 42A, 42B, and so forth, constituting input means via which the player operates the game. The cartridge interface 32 has an opening for receiving a game cartridge 12, having a signal input/output terminal formed deep inside the opening. When the game cartridge 12 is inserted into the opening until the signal input/output terminal is brought into contact with a terminal, not shown, of the game cartridge 12, signals can be exchanged with the game cartridge 12. The communication section 34 may perform data communication with other game machines via, for example, a communication cable.

In the following, a specific technique for realizing a game machine capable of causing the player to pay attention to a game title image, using a portable game machine 10 having a structure according to the present invention, will be described.

FIGS. 3 to 11 show an example of a title animation image to be shown on the display 22 of the portable game machine 10. For displaying a default game title image shown in FIG. 8, an animation image containing the images of FIGS. 3 to 8 in this order is displayed. For displaying game title images other than the default game title image, i.e., an optional game title image shown in FIG. 11, an animation image containing the images of FIGS. 3 to 5 and FIGS. 9 to 11 in this order is displayed.

Figure 3:
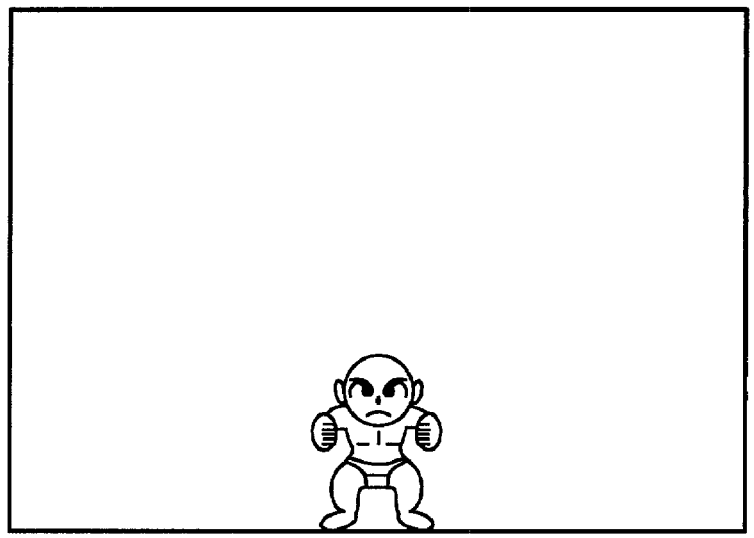
FIG. 3 is a diagram showing an example of a title animation.
Figure 4:
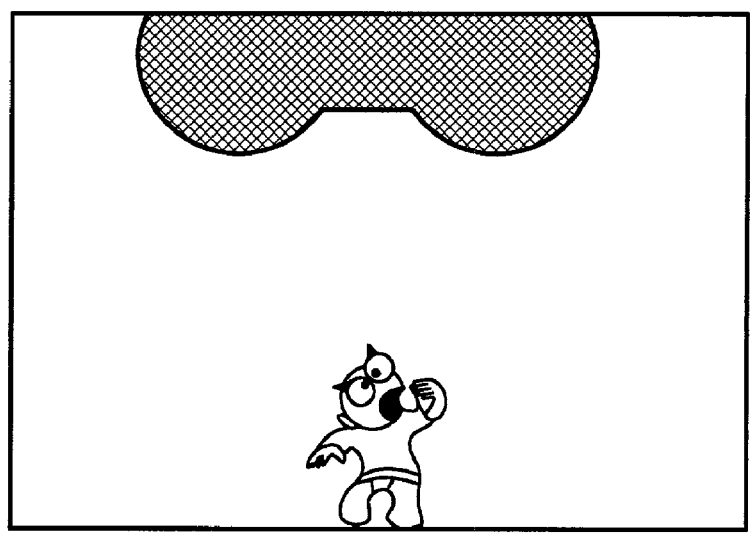
FIG. 4 is a diagram showing an example of a title animation.
Figure 5:
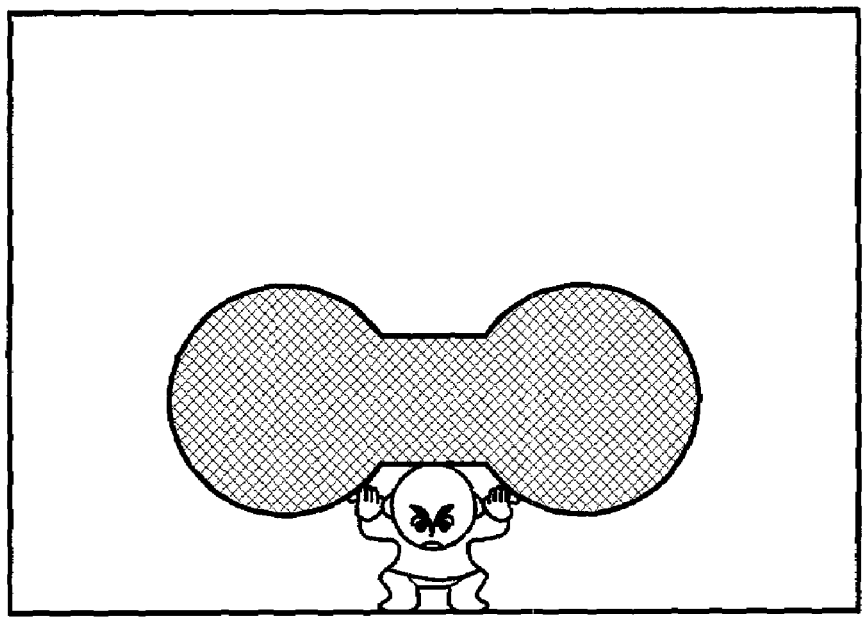
FIG. 5 is a diagram showing an example of a title animation.
Figure 6:
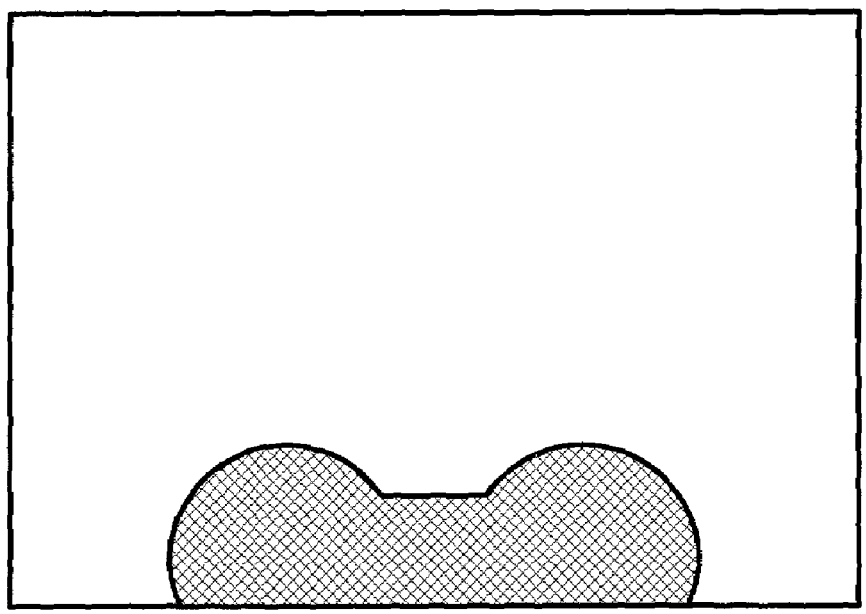
FIG. 6 is a diagram showing an example of a title animation.
Figure 8:
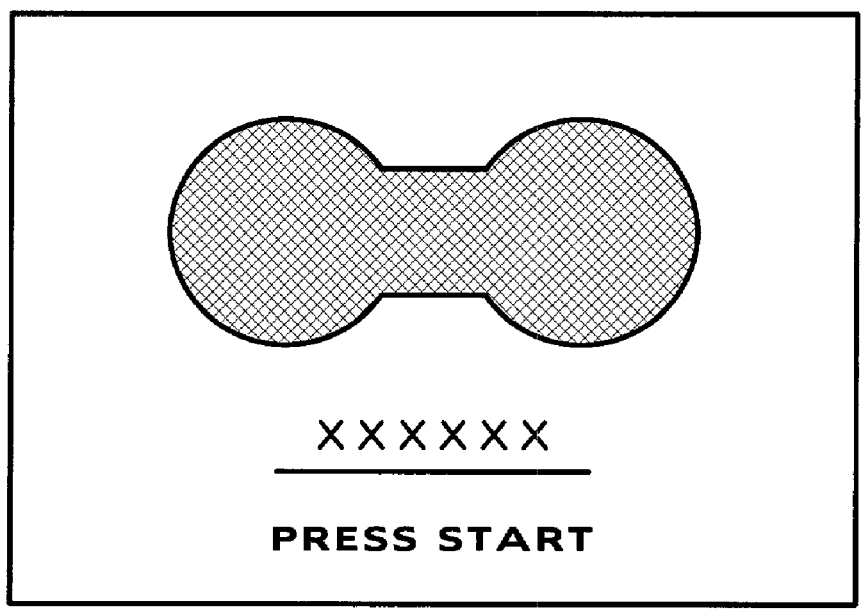
FIG. 8 is a diagram showing an example of a default game title image.

In this portable game machine 10, a game character may appear in the lower portion on the screen when the power is turned on or the game ends, as shown in FIG. 3. Thereafter, a barbell falls from the top of the screen, as shown in FIG. 4, and is received by the game character with his both hands, as shown in FIG. 5. If neither the button 42A nor 42B is then pressed by the player, the game character is squashed by the barbell, as shown in FIG. 6. Then, the barbell floats from the bottom of the screen, as shown in FIG. 6, and remains floating around the middle of the screen. Finally, as shown in FIG. 8, a game title text, represented as "XXXXXX" in the drawing, is displayed under the barbell on the screen, together with a blinking message "PRESS START". Copyright notices, not shown, and so forth, may additionally be displayed in the screen image of FIG. 8.

When the player hits either the button 42A or 42B many times while the screen image of FIG. 5, i.e., an intermediate animation image, is displayed on the screen, that screen image remains displayed. In the above, for a faster hitting speed, the intermediate animation images change showing the game character gradually lifting the barbell. That is, the intermediate animation image is an animation image which shows the game character lifting the barbell in anguish. As intermediate animation images, four types of images are prepared in advance, from one showing the barbell in a lower position to another in a higher position. When the player hits the button 42A or 42B many times at a higher speed, the images of the intermediate animation change gradually from one with the barbell in a lower position to another in a higher position. For a slower hitting speed, on the other hand, the images change gradually from one with the barbell in a higher position to another in a lower position.

Figure 9:
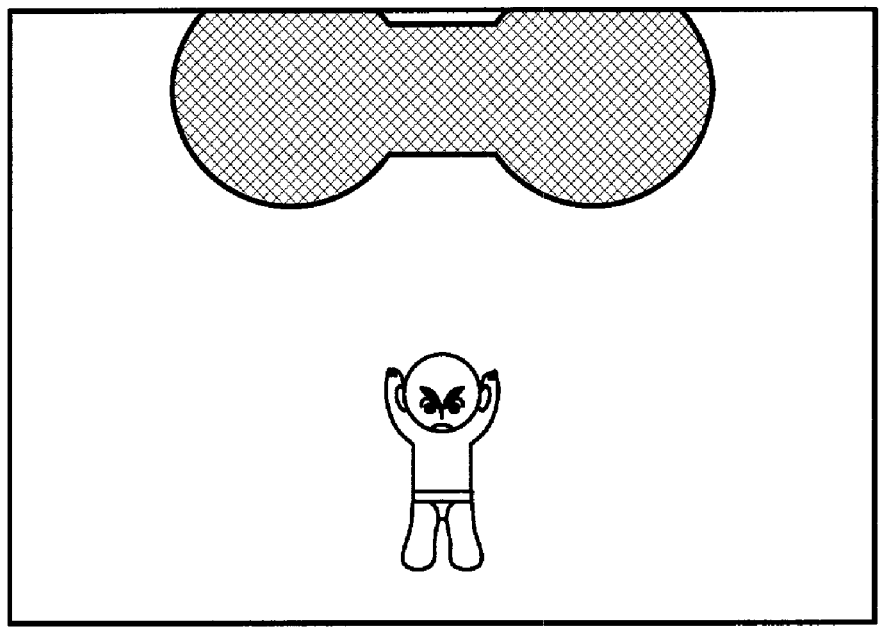
FIG. 9 is a diagram showing an example of a title animation.
Figure 10:
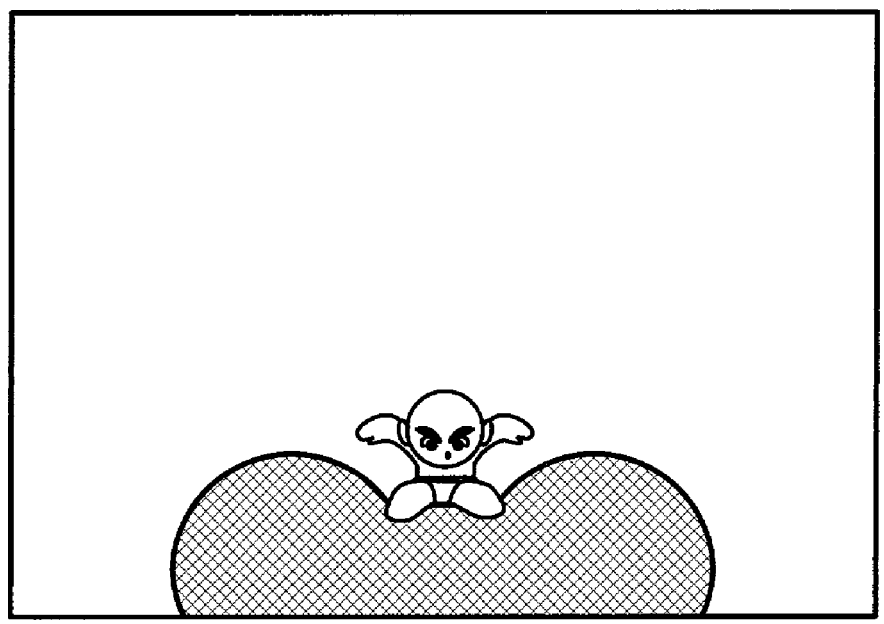
FIG. 10 is a diagram showing an example of a title animation.
Figure 11:
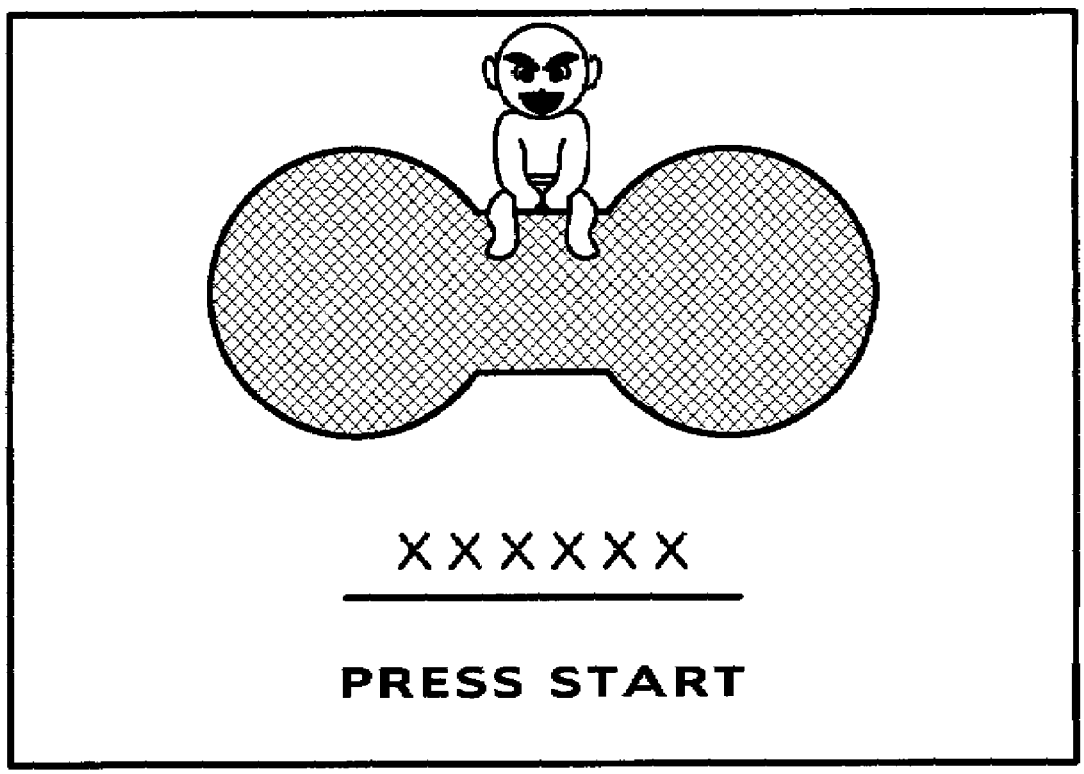
FIG. 11 is a diagram showing an example of an optional game title animation.

When the button 42A or 42B is continuously hit many times at a speed higher than a predetermined speed, the game character throws the barbell away, as shown in FIG. 9. Thereafter, the barbell reappears from the bottom of the screen, and the game character sits on the barbell, as shown in FIG. 10. Finally, the barbell with the game character sitting thereon remains floating around the center of the screen, and a game title text (represented by "XXXXXX" in FIG. 11) appears below the barbell, together with the blinking message "PRESS START", as shown in FIG. 11. Copyright information and so forth, not shown, may additionally be displayed on the screen shown in FIG. 8.

Figure 7:
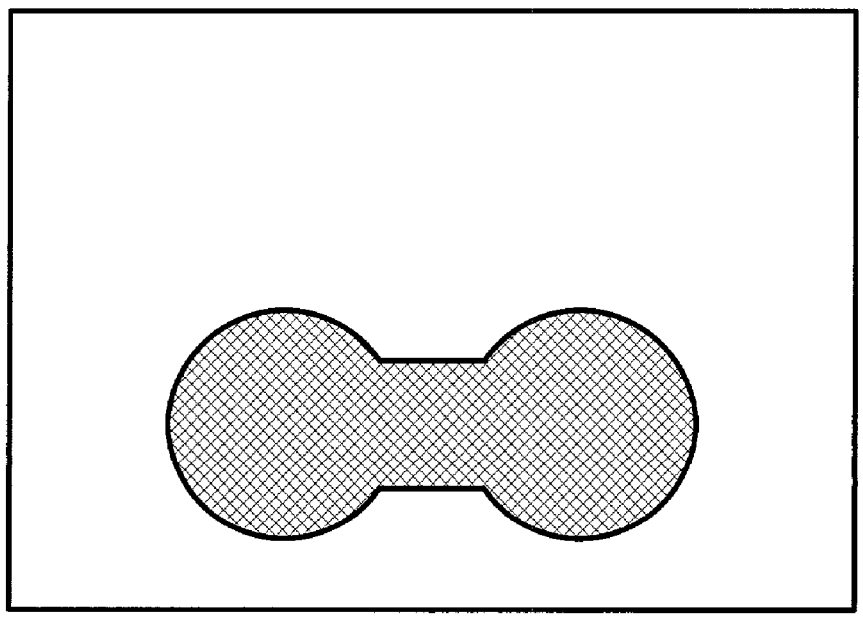
FIG. 7 is a diagram showing an example of a title animation.

Meanwhile, in the case where the user hits the button 42A or 42B many times at a slower speed while the screen image remains displayed as shown in FIG. 5, the game character is smashed by the barbell, as shown in FIG. 6. Then, the barbell floats from the bottom of the screen, as shown in FIG. 7, and remains floating around the center of the screen, followed by displaying of a game title text, together with the message "PRESS START", below the barbell, as shown in FIG. 8.

As described above, with this portable game machine 10, displaying of the introductory animation images (FIGS. 3 and 4) on the display 22 precedes displaying of a game title image. Specifically, when the user begins continuous hitting of the button 42A or 42B after predetermined timing, that is, after displaying of the intermediate animation images (FIG. 5) begun subsequent to the introductory animation images, the intermediate animation images change accordingly until filler animation images (FIGS. 9 and 10) and then an optional game title image (FIG. 11, with the game character displayed) are sequentially displayed. On the other hand, in the case where the player does not hit the button 42A or 42B or hits only at a speed slower than a predetermined speed while intermediate animation image (FIG. 5) remains displayed, filler animation images (FIGS. 6 and 7) and then a default game title image (FIG. 8, with the game character not displayed) are sequentially displayed.

Figure 12:
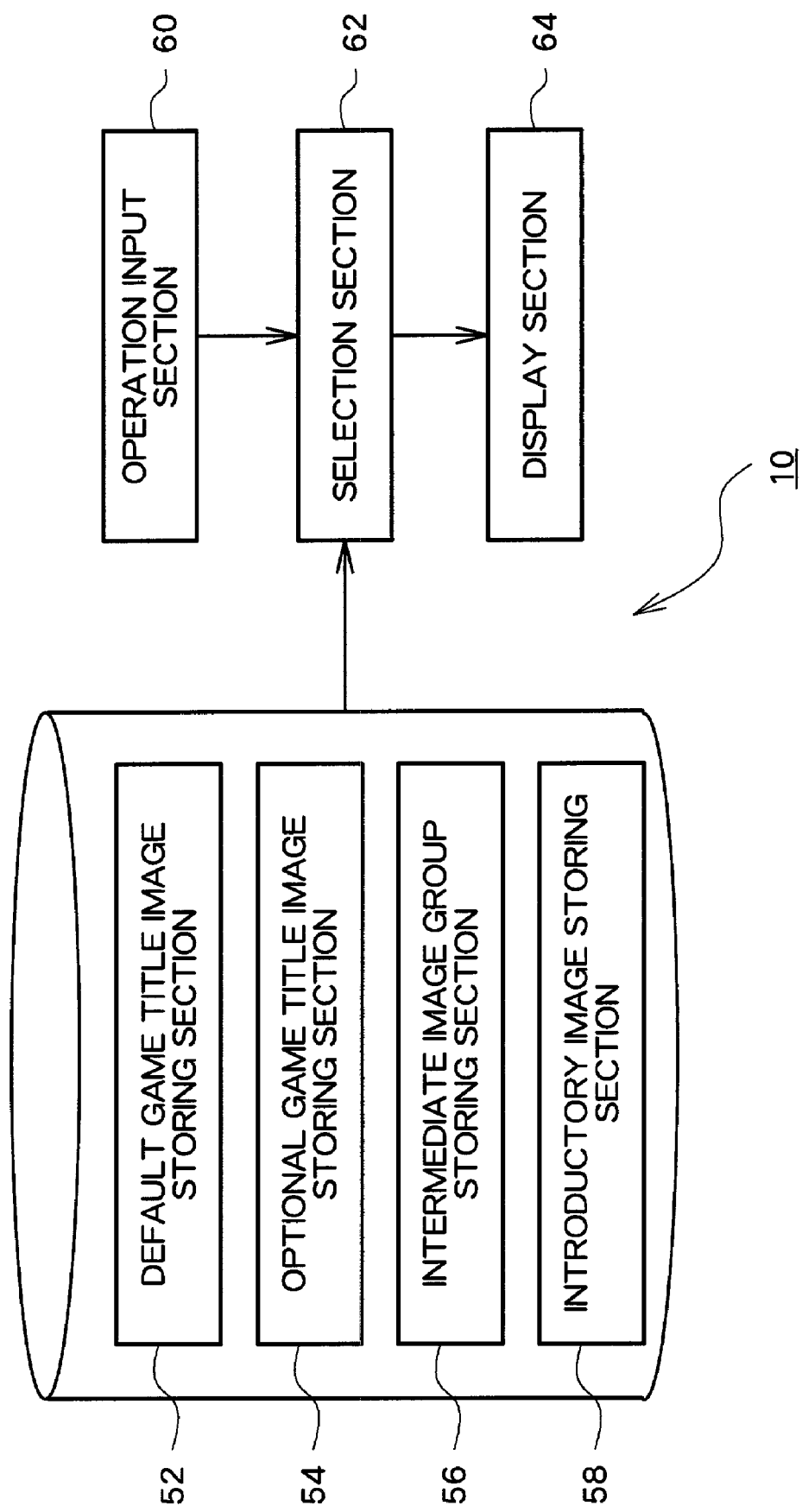
FIG. 12 is a function block diagram showing mainly functions according to the present invention among functions realized using the portable game device.

FIG. 12 is a diagram showing functions realized in the portable game machine 10 when a game title image is displayed. The respective shown function blocks are realized by the portable game machine 10 executing a game program stored in the game cartridge 12. As shown, the portable game machine 10 realizes the function blocks including a default game title image storing section 52, an optional game title image storing section 54, an intermediate image group storing section 56, an introductory image storing section 58, an operation input section 60, a selection section 62, and a display section 64. Note that the selection section 62 and display section 64 serve as a selectively displaying means for selectively displaying either a default or optional game title image according to the content of a game operation input made after predetermined timing.

The default game title image storing section 52 is constructed including a RAM 16 and stores a default game title image (FIG. 8) and filler animation images (FIGS. 6 and 7), read from the game cartridge 12. Also, the optional game title image storing section 54 is constructed including a RAM 16, and stores an optional game title image (FIG. 11) and filler animation images (FIGS. 9 and 10), read from the game cartridge 12. The intermediate image group storing section 56 is constructed including a RAM 16, and stores a group of intermediate animation images, read from the game cartridge 12. A group of intermediate animation images include an intermediate animation image shown in FIG. 5, and comprises four kinds of intermediate animation images described above. The introductory image storing section 58 is constructed including a RAM 16 and stores introductory animation images (FIGS. 3 and 4), read from the game cartridge 12.

The operation input section 60 is constructed including buttons 42A and 42B and, in response to the player's pressing the button 42A or 42B, outputs a signal indicating the pressing to the selection section 62. According to the content of a game operation input by the player, output from the operation input section 60, the selection section 62 determines which of the default and optional game title images is to be displayed. The display section 64 is constructed including a display 22 and shows on the display 22 a game title image which was determined and read by the selection section 52 from the storing sections 52, 54.

Figure 13:
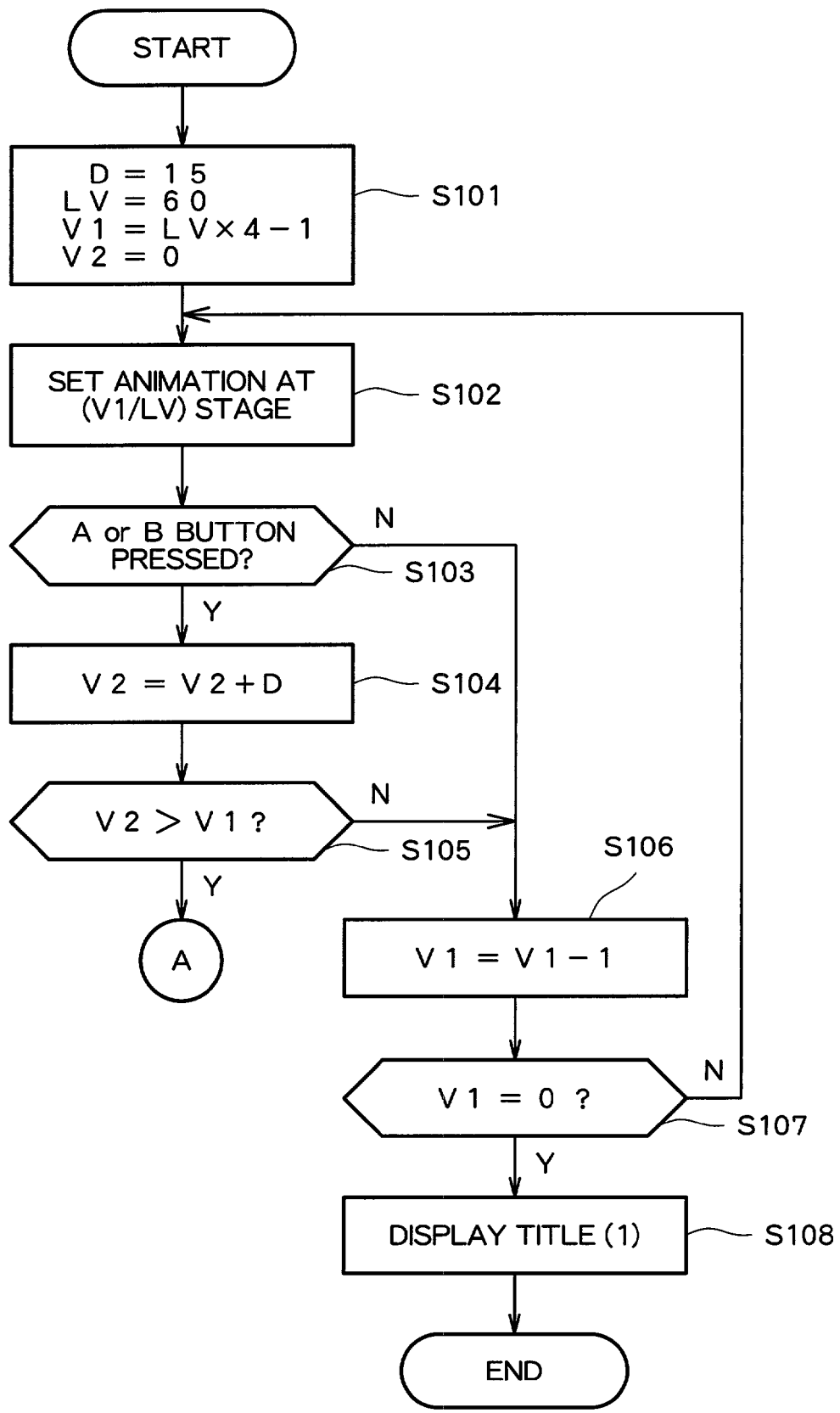
FIG. 13 is a flowchart explaining processing for displaying a game title image.

FIGS. 13 and 14 are flowcharts explaining in further detail the processing in the selection section 62. The shown processing is to be executed upon completion of the displaying of an introductory animation image (after predetermined timing). During the processing, variables V1, V2 are initialized and fixed values D, LV are set (S101; FIG. 13). The variables V1 and V2 store values indicating the state in which the player makes a game operation input, specifically the variable V1 being initialized to a value four times the fixed value LV deducted by 1 and the variable V2 being initialized to zero. Also, the fixed value D is an increase of the variable V2 when the player hits the button 42A or 42B and set at 15 at S101. Further, the fixed value LV is a change parameter of an intermediate animation image and set at 60 at S101. Note that the values set for the fixed values D, LV, variables V1, V2, and values set for the fixed or variable values are naturally different depending on the type of operation input section 60.

Next, an intermediate animation image at the stage int (V1/LV) is displayed (S102), in which "int" is a function for changing an argument into an integer (by rounding down decimal places). Further, whether either the button 42A or 42B has been pressed is determined (S103). When it is determined that either button has been pressed, the variable V2 is increased by a fixed value D (S104). Whether the resultant variable V2 is larger than the variable V1 is determined (S105). Meanwhile, when it is determined at S103 that neither the button 42A nor 42B has been pressed, or at S105 that the resultant variable V1 is equal to or smaller than the variable V1, the variable V1 is decreased by one (S106). As long as the variable V1 is anything but zero (S107), the process returns to S102, at which an intermediate animation image at the stage int (V1/LV) is displayed. When the variable V1 is zero, on the other hand, a default game title image is read from the default game title image storing section 52, and displayed by the display section 64 (S108).

When it is determined at S105 that the resultant variable V2 is larger than the variable V1, an intermediate animation image at the stage int (V2/LV) is displayed (S109; FIG. 14). Subsequently, whether either the button 42A or 42B has been pressed is determined (S110). In the case where it is determined that either the button 42A or 42B has been pressed, the variable V2 is increased by a fixed value D(S111). Then, it is determined whether the resultant variable V2 is larger than a value four times the fixed value LV (S112). When it is determined that it is not, the process returns to S109, where an intermediate animation image at the stage int (V2/LV) is displayed. When it is determined at S112 that the variable V2 is larger than a value four times the fixed value LV, on the other hand, an optional game title image is read from the optional game title image storing section 54, and displayed by the display section 64 (S113).

When it is determined at S110 that neither button 42A nor 42B has been pressed, the variable V2 is decreased by one (S114). If the variable V2 is anything other than zero (S115), the process returns to S109, where an intermediate animation image at the stage int (V2/LV) is displayed. When the variable V2 is zero, on the other hand, a default game title image is read from the default game title image storing section 52 and displayed by the display section 64 (S116).

As described above, in this embodiment, either a default or optional game title image is selectively displayed according to the content of a game operation input made after displaying of an introductory animation image. This arrangement can cause the player to pay attention to the game title image. Further, an arrangement in which a default game title image is displayed when no game operation input is made or when the game operation input made does not satisfy predetermined conditions (hitting the button 42A or 42B many times at a predetermined speed for a predetermined time) can impart novelty value to an optional game title image. Still further, as an arrangement in which an intermediate animation image is displayed according to the content of a game operation input made after displaying of an introductory animation image can impart game tastes to title displaying.

Yet further, an arrangement in which a game title image to be displayed is determined according to a game operation input made after a predetermined timing requires the player to contemplate a timing at which to make a game operation input in order to see an optional game title image, which can enhance the nature of the game.

It should be noted that the present invention is not limited to the embodiment described above. For example, whereas a technique for causing a player to pay attention to a game title image is applied to a portable game machine 10 in the above, the present invention can be similarly applied to a home-use or business-use game machine of an installed type. Also, the present invention can be similarly applied to displaying of the title image of a game program when the game program is executed using a personal computer.

Whereas either a default or optional game title image is selectively displayed according to the content of a game operation input in the above description, two or more kinds of optional game tile images which are different from a default game title image may be prepared in advance so that either default or optional game title images can be selectively displayed according to the content of a game operation input. This arrangement can further enhance the game nature. In this arrangement, respective game title images (default and optional game title images) may be stored either all in a single memory device such as a RAM, a hard disk memory device, and so forth, or partially in a separate memory device. Further, all or some of the game title images may be obtained over a network such as the Internet.

What is claimed is:

1. A game machine capable of executing a game having a title and displaying a game title image consisting of a display image containing at least the title of the game, comprising:

storing means for storing at least two kinds of game title images, each image consisting of a display image containing at least the title of the game;

operation input means for allowing a game operation input by a player; and selectively displaying means for displaying either one of the at least two kinds of game title images depending on content of the game operation input, wherein said game operation input comprises a repeated game operation input to said operation input means at a speed over a predetermined speed based on more than a double click.

2. The game machine according to claim 1, wherein the selectively displaying means displays a default game title image out of the at least two kinds of game title images when no game operation input is made within a predetermined time period and displays either one of the at least two kinds of game title image when a game operation input is made within a predetermined time period depending on whether the game operation input satisfies a predetermined condition.

3. The game machine according to claim 1, wherein the selectively displaying means displays an intermediate image before displaying either one of the at least two kinds of game title image, the intermediate image varying according to content of the game operation input.

4. The game machine according to claim 1, wherein the selectively displaying means displays either one of the at least two kinds of game title image depending on content of the game operation input made after a predetermined timing.

5. A game title display control method for controlling displaying of a game title image consisting of a display image containing at least the title of the game, comprising:
   a game operation input obtaining step of obtaining a player's game operation input; and
   a game title displaying step of displaying either one of at least two kinds of game title image according to content of the game operation input, each image consisting of a display image containing at least the title of the game, wherein said game operation input comprises a repeated game operation input by a player at a speed over a predetermined speed based on more than a double click.

6. A game title image control method according to claim 1, wherein, at the game title displaying step, either one of the at least two kinds of game title images is displayed according to the game operation input made after a predetermined timing.

7. A program product comprising a storage medium and a program for causing a computer to operate as a game machine capable of displaying a game title image consisting of a display image containing at least the title of the game, and causing the computer to operate as:
   storing means for storing at least two kinds of game title images, each image consisting of a display image containing at least the title of the game;
   operation input means for allowing a game operation input by a player, and
   selectively displaying means for displaying at least two kinds of game title images according to content of the game operation input, wherein said game operation input comprises a repeated game operation input to said operation input means at a speed over a predetermined speed based on more than a double click.

8. The program product according to claim 7, wherein the selectively displaying means displays either one of the at least two kinds of game title images according to content of the game operation input made after a predetermined timing.

9. The game machine according to claim 1, wherein said speed is measured over a predetermined time.

10. The game machine according to claim 1, wherein said game operation input comprises a continuous and rapid game operation input to said operation input means.

11. The game machine according to claim 3, wherein a rank of an intermediate animation is upgraded when a game operation input is at a speed over a predetermined speed for a predetermined time and a rank is reduced when a game operation input falls below a predetermined speed for a predetermined time.

* * * * *